A. H. HANDLAN, Jr.
SIGNAL LAMP.
APPLICATION FILED MAY 29, 1911.
1,042,787.
Patented Oct. 29, 1912.
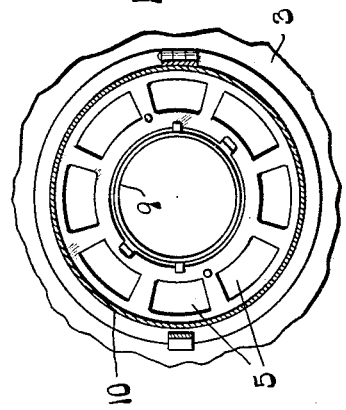
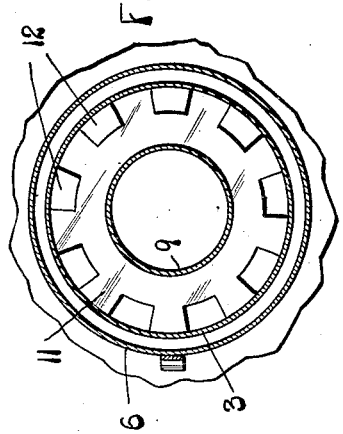
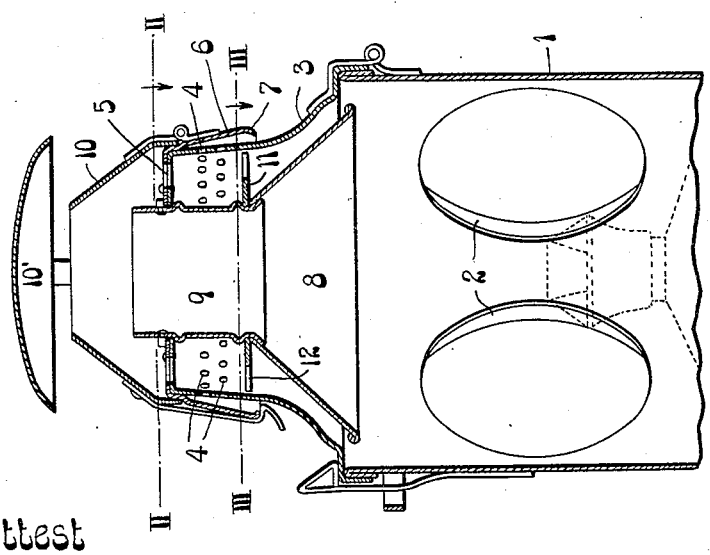
Attest
A. J. McCauley
E. B. Finn
Inventor:
A. H. Handlan, Jr
by Knight & Cook
Att'ys.

UNITED STATES PATENT OFFICE.

ALEXANDER H. HANDLAN, JR., OF ST. LOUIS, MISSOURI.

SIGNAL-LAMP.

1,042,787.  Specification of Letters Patent.  Patented Oct. 29, 1912.

Application filed May 29, 1911. Serial No. 630,080.

*To all whom it may concern:*

Be it known that I, ALEXANDER H. HANDLAN, Jr., a citizen of the United States of America, residing at St. Louis, in the State of Missouri, have invented certain new and useful Improvements in Signal-Lamps, of which the following is a full, clear, and exact description, reference being had to the accompanying drawings, forming part of this specification.

My invention relates to signal lamps for railway uses, the present invention pertaining particularly to a ventilator for lamps of this description.

It is a fact well recognized by lamp manufacturers that to produce a signal lamp of a satisfactory description, it is absolutely necessary that the ventilator of the lamp be of the greatest simplicity and so constructed as to really and efficiently equalize the air currents that enter into the lamp body, and the air currents that flow from the lamp body. It is also highly necessary to so construct the ventilator as to prevent the occurrence of "sweat" in the lamp with resultant corrosion or rust of the metal parts of the lamp, or interfere with the passage of rays of light through the lenses of the lamp. It is further necessary to so construct the ventilator as to eliminate the possibility of the extinguishment of the flame in the lamp by violent blasts of air caused by high winds and to counteract and proportionately dispel such blasts when they enter materially into the interior of the lamp body so that only so much of the air as is necessary to support combustion in the burner chamber in the lamp will find entrance thereinto and the remainder, or superfluous air, forced into the ventilator will escape therefrom without entering the burner chamber.

My ventilator is designed to fulfil all of the requirements herein mentioned and is so constructed as to render its manufacture inexpensive and the assemblage of its parts such that the assemblage may be carried out by unskilled labor.

Figure I is a vertical section through the upper portion of a signal lamp shell and my ventilator. Fig. II is a horizontal section taken on line II—II, Fig. I. Fig. III is a horizontal section taken on line III—III, Fig. I.

In the accompanying drawings: 1 designates the body shell of a signal lamp provided with the usual lens apertures 2. This shell may be of any ordinary description, as no invention is herein claimed therefor.

3 designates the outer shell or shield of my ventilator located above the body shell of the lamp. This ventilator shell is of flaring shape and is preferably drawn from a single piece of metal so that there are no seams present therein. The ventilator shell is provided near its upper end with horizontal air inlet openings 4, (see Fig. I), and a spacing member within the upper end of the ventilator shell formed with elongated slots 5, (see Figs. I and II). The air necessary to sustain combustion of a flame within the burner chamber of the lamp is admitted through the horizontal air inlet openings 4 in the ventilator shell and to prevent strong currents of air resulting from high wind from blowing directly through these air inlets, I place around the ventilator shell a wind break ring 6 that overhangs the air inlets and the lower free end of which is located beneath the air inlets, as seen in Fig. I. To effectually guard against strong currents of air through the air inlet openings, I provide the wind break ring with an inturned annular flange 7 located at its lower edge that extends toward the ventilator shell, as seen in Fig. I. It will therefore be seen that the air currents entering the lamp are required to move upwardly in a contracted passage between the wind break ring and the ventilator shell before they reach the air inlet openings 4.

8 designates a bell located within the ventilator shell 3 and depending from a flue 9 by which it is attached to the top of the ventilator shell. This bell is concentric with the ventilator shell, but spaced apart therefrom to permit the downward passage of air between the bell and the ventilator shell and into the burner chamber in the main shell of the lamp. The bell serves to direct descending air currents outwardly to the wall of the lamp shell and, as a consequence, the air so delivered passes downwardly along the lamp shell wall, to afterward move inwardly to the lamp burner and supply the necessary oxygen to a flame burning therefrom without the occurrence of any blast of air directly toward the flame in a manner to interfere with its proper burning. The heated air rises in the burner chamber and passes centrally through the bell 8 and the flue 9 to the top of the ventilator and, inasmuch as the top of the ventilator is protected by a usual frusto-conical wind guard 10 and a cap piece 10', there is no liability of entrance of air through these members to interfere with the proper burning of the flame in the lamp. The cap piece 10' is spaced away from the upper edge of the wind guard 10 to allow an air current to pass freely across the top of the wind guard with the result of creating a suction in the shell 3 and flue 9, thereby causing the heated air to pass up the unobstructed passageway formed by the flue 9 and wind guard 10 and mix with said air current, whereby it is carried away from the lantern. The unobstructed passageway leading from the flame to the cap piece 10' is one of the desirable features of this invention; it provides for the heated air being withdrawn rapidly from the burner chamber of the lantern and thereby prevents sweat from collecting on and rusting the metal parts of the lantern.

11 designates an air diffusing collar surrounding the flue 9 above the bell 8 and beneath the air inlet openings 4 in the ventilator shell 3. This collar spans the space between the upper end of the bell and the ventilator shell and is provided with notches 12 extending inwardly from its outer edge, (see Fig. III), through which the air to supply the flame of the lamp is required to pass after entering the ventilator inlet openings. The notches in the collar provide for only the requisite passage of air to the burner chamber of the lamp. All excess quantity of air entering the ventilator is required to escape through the elongated slots 5 in the top of the ventilator shell and through the top wind guard 10.

My signal lamp is one intended especially for use upon railway trains, in which use the lamp is constantly, during the movement of the train, subjected to a strong blast or draft of air. The air, striking the ventilator of the lamp, is forcibly driven into the ventilator through the air inlet openings and there is a strong current of air also across the top of the wind guard 10 which creates a suction in the ventilator by reason of which a considerable portion of the air entering into the ventilator chamber through the inlet openings 4 is constantly drawn from said chamber through the elongated slots 5, instead of passing downwardly into the burner chamber of the lamp to great detriment of the flame burning therein. The air forcibly delivered into the ventilator through the inlet openings strikes the flue 9 and is forced around in the annular space between said flue and the shell 3 so as to partake of a circular or whirling motion within the ventilator chamber, and in order that so much of this air as is necessary to provide for the proper burning of the flame in the lamp burner may be delivered into the burner chamber in a direct downward course instead of in a downward and circular course, it is necessary to provide an air diffusing device within the ventilator beneath the air inlet openings that will break up the circular air current. The notched collar 11 which, as previously mentioned, spans the space between the upper end of the bell and the ventilator shell has wings at its outer edge which perform this service. The whirling current of air naturally crowds outwardly to the ventilator shell as it circulates in the chamber above the air diffusing collar, and only so much of the air as is sufficient to supply the needs of the flame in the lamp is drawn downwardly in a straight course through the notches in the diffusing collar, the downward draft being caused by the ascent of heated air though the central bell 8 and its flue. Experiments have proven that a collar notched to produce wings at its outer edge and located as herein described is an especially practicable air diffusing member and that the breaking up the circular air current cannot be satisfactorily obtained by the use of a perforated collar.

It is important that the air passageways extend to the outer edge of the collar, thereby furnishing air passageways through which the downwardly flowing currents of air may move in close proximity to the ventilator shell, when the motion of the air is changed from a circular one to a directly descending one. It is also essential that the surplus air entering through the air inlet openings 4 be allowed to ascend as little unrestricted in its escape as possible compatible with the burner chamber receiving its full complement of fresh air. Experiments have demonstrated that in a high wind the ascending surplus air cannot escape as freely through a plate having a large number of round holes therein as through a plate provided with elongated slots; the undue restriction of the escape of such surplus air injuriously affecting the action of the flame in the burner chamber, the steady and undiminished burning of which being the object of my invention.

I claim:

1. In a signal lamp, a burner chamber, a ventilator shell above said burner chamber provided with air inlet openings in its wall and a slotted spacing member within its upper end, a flue within and spaced away from said shell providing a passageway between the air inlet openings and the top of the shell, and a collar provided with inwardly extending peripheral slots and surrounding said flue and located between the air inlet openings and the burner chamber.

2. In a signal lamp, a burner chamber, a ventilator shell above said burner chamber provided with air inlet openings in its wall, a flue within and spaced away from said shell, a slotted spacing member surrounding said flue and located in the ventilator shell between the air inlet openings and the top of said shell and a collar provided with inwardly extending peripheral slots and surrounding said flue and located between the air inlet openings and the burner chamber, said slotted spacing member and collar providing passageways for ascending and descending air currents.

3. In a signal lamp, a burner chamber, a ventilator shell above said burner chamber provided with air inlet openings in its wall, a flue within and spaced away from said shell, a slotted spacing member surrounding said flue and located in the ventilator shell between the air inlet openings and the top of said shell, a collar provided with inwardly extending peripheral slots and surrounding said flue and located between the air inlet openings and the burner chamber, said slotted spacing member and collar providing passageways for ascending and descending air currents and a wind break ring surrounding the ventilator shell and air inlet openings.

ALEXANDER H. HANDLAN, Jr.

In the presence of—
A. J. McCauley,
E. B. Linn.

---

Copies of this patent may be obtained for five cents each, by addressing the "Commissioner of Patents, Washington, D. C."